United States Patent [19]

Stripling

[11] 3,802,275

[45] Apr. 9, 1974

[54] POLARIZED BEARING ASSEMBLY FOR GYRO

[75] Inventor: William W. Stripling, Huntsville, Ala.

[73] Assignee: The United States of America as represented by the Secretary of the Army, Washington, D.C.

[22] Filed: Sept. 19, 1972

[21] Appl. No.: 290,290

[52] U.S. Cl. .................................. 74/5 R
[51] Int. Cl. ............................... G01c 19/16
[58] Field of Search ............ 74/5 R, 5.7, 5.1; 308/DIG. 1

[56] References Cited
UNITED STATES PATENTS

| | | |
|---|---|---|
| 3,698,776 | 10/1972 | Litman et al. ............... 74/5 R |
| 3,238,792 | 3/1966 | Unterberger .................. 74/5.7 |
| 3,698,251 | 10/1972 | Silvia ............................. 74/5 R |
| 2,976,736 | 3/1961 | Cook .............................. 74/5 R |
| 3,238,790 | 3/1966 | Schulien et al. .............. 74/5 R |

Primary Examiner—Manuel A. Antonakas
Attorney, Agent, or Firm—Edward J. Kelly; Herbert Berl; Charles R. Carter

[57] ABSTRACT

A bearing assembly for use in supporting a gyro rotor in a missile during flight in a missile trajectory. During acceleration, the rear race is supported by a mounting plate. Ball bearings held in a cup shaped annular retainer support a hemispherical outer bearing race of the rotor for rotation around the stator during deceleration. A pin secures the rotor in place during shipment or storage and is sheared during missile acceleration.

4 Claims, 2 Drawing Figures

PATENTED APR 9 1974 3,802,275

POLARIZED BEARING ASSEMBLY FOR GYRO

BACKGROUND OF THE INVENTION

This invention relates to polarized bearing assemblies. Because terminal guided missiles experience high acceleration shock when launched from a cannon (12,000–15,000 G's) conventional gyro and seeker bearing design is difficult and expensive. This high acceleration shock overstresses the forward race of bearings in a spherical ball bearing design and this same race of bearings is unloaded during the deceleration or terminal phase of the trajectory. Alignment of the two rotor hemispherical races of the conventional bearing is critical in the utilization of a two race spherical ball bearing gyro and is the major contributor to drift. The cost of properly aligning these two hemispheres is almost 50 percent of the cost of the total gyro.

SUMMARY OF THE INVENTION

This invention utilizes the fact that the forward race of balls is not required during the terminal guidance phase as the deceleration force acts on the rear race and bearings, in effect, loads the bearing and gives the same results as a two race bearing. During the acceleration phase, the rear race is supported by a mounting plate.

This invention may be better understood from the following detailed description taken in conjunction with the accompanying drawing.

DESCRIPTION OF THE PREFERRED EMBODIMENT

Figure 1:
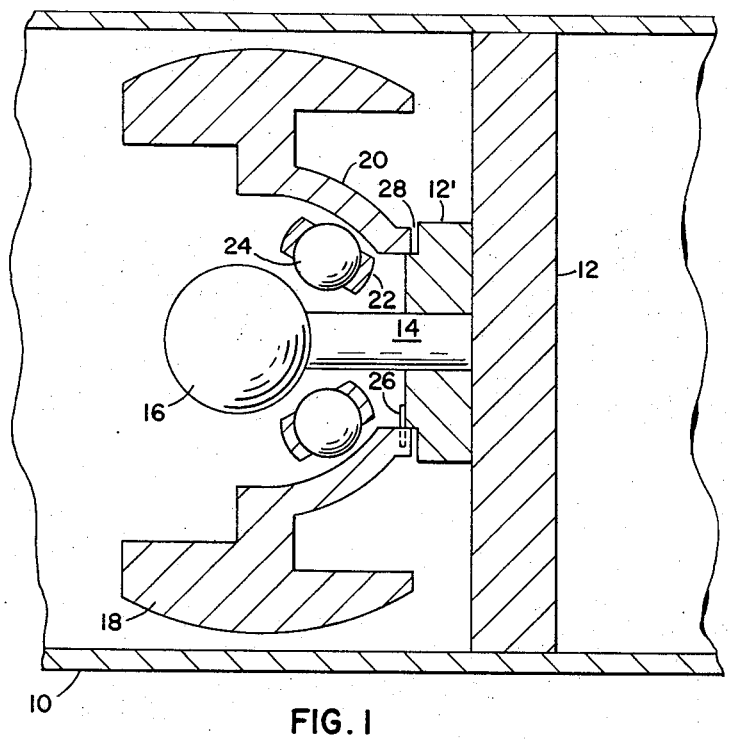
FIG. 1 is a diagrammatical view of the assembly prior to missile acceleration.
Figure 2:
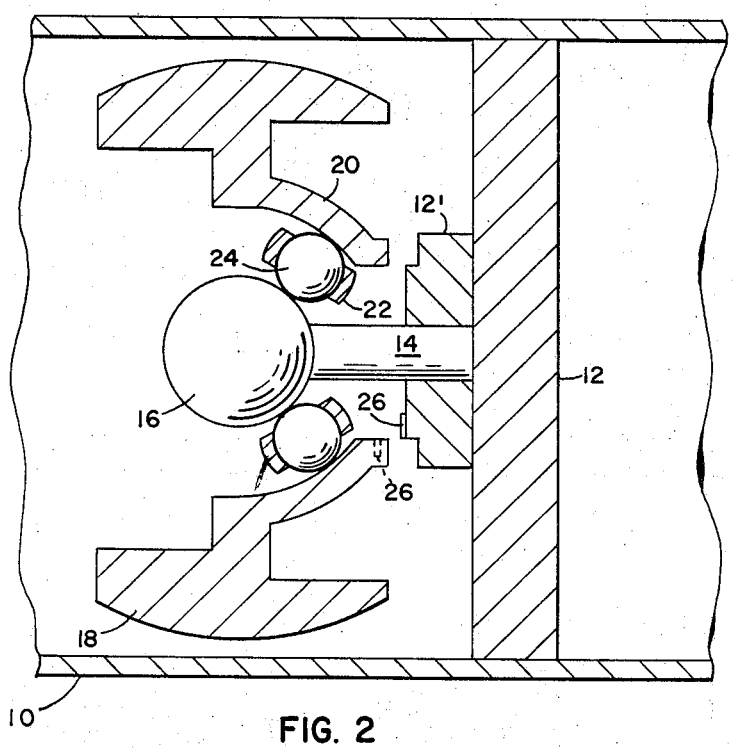
FIG. 2 is a diagrammatical view of the assembly during missile deceleration.

Reference numeral 10 indicates part of a missile housing having a mounting plate 12 attached thereto. A shaft 14 has one end mounted on plate 12 and a spherical gyro stator 16 is connected to the opposite end of the shaft. Gyro rotor 18 is integrally connected to a hemispherical outer bearing race 20. A cup shaped annular retainer 22 holds ball bearings 24 therein and is disposed between stator 16 and outer bearing race 20.

In the position shown in FIG. 1, just prior to acceleration, the rotor is secured to an extension 12' of the mounting plate by a shear pin 26. A recess 28 is provided between the mounting plate extension 12' and the hemispherical outer bearing race 20. When the missile is fired from a cannon inertia causes rotor 18 to shift its position in FIG. 1 thereby shearing pin 26. The race 20 will engage with and be supported and held stationary by the plate 12 and its extension 12'. When the missile enters its deceleration phase, the rotor is spun up by means (not shown), race 20 is then supported by these balls for rotation around the stator 16 until missile trajectory termination.

I claim:

1. A polarized bearing assembly for use in supporting a gyro in a missile comprising: a mounting plate attached to said missile; a shaft having one end mounted on said plate; a spherical gyro stator connected to the opposite end of said shaft; a gyro rotor disposed for rotation around said stator, said rotor including a single hemispherical outer bearing race; and a cup shaped annular bearing retainer including only a single row of ball bearings disposed between said stator and said outer race for solely supporting said rotor during rotational operation thereof in the deceleration phase of the missile trajectory, said mounting plate having an extension for supporting said outer race during missile acceleration.

2. An assembly as set forth in claim 1 wherein said single hemispherical outer bearing race is integral with said rotor.

3. A polarized bearing assembly for use in supporting a gyro in a missile comprising: a mounting plate attached to said missile; a shaft having one end mounted on said plate; a spherical gyro stator connected to the opposite end of said shaft; a gyro rotor disposed for rotation around said stator, said rotor including a single hemispherical outer bearing race that is integral with said rotor; means for securing said hemispherical outer bearing race to said mounting plate; and a cup shaped annular bearing retainer including ball bearings disposed between said stator and said outer races for solely supporting said rotor during rotational operation thereof in the deceleration phase of the missile trajectory.

4. An assembly as set forth in claim 3 wherein said securing means is a shear pin and said mounting plate is provided with a recess to allow movement of said hemispherical outer bearing race and said mounting plate for shearing said pin.

* * * * *